United States Patent
Hennings et al.

(10) Patent No.: US 10,746,688 B2
(45) Date of Patent: Aug. 18, 2020

(54) MEASURING PROBE AND METHOD FOR FILLING A PROBE INTERIOR

(71) Applicant: Endress+Hauser Conducta GmbH+Co. KG, Gerlingen (DE)

(72) Inventors: Erik Hennings, Freiberg (DE); Jens Vettermann, Großweitzschen (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 282 days.

(21) Appl. No.: 15/790,346

(22) Filed: Oct. 23, 2017

(65) Prior Publication Data
US 2018/0120252 A1  May 3, 2018

(30) Foreign Application Priority Data
Oct. 27, 2016  (DE) .................... 10 2016 120 581

(51) Int. Cl.
*G01N 27/404* (2006.01)

(52) U.S. Cl.
CPC .................. *G01N 27/404* (2013.01)

(58) Field of Classification Search
CPC ............ G01N 27/404; G01N 27/333; G01N 27/4166; G01N 27/4167; G01N 27/301; G01N 27/302; G01N 27/3335; G01N 27/416; C12M 41/26
See application file for complete search history.

(56) References Cited

U.S. PATENT DOCUMENTS

| 4,413,627 A * | 11/1983 | Schindler ........... A61B 5/14542 |
| | | 204/403.06 |
| 4,543,175 A * | 9/1985 | Subsara ............. G01N 27/4035 |
| | | 204/400 |
| 6,251,244 B1 | 6/2001 | Kiesele et al. |
| 2009/0026077 A1 | 1/2009 | Dopp |

(Continued)

FOREIGN PATENT DOCUMENTS

| CN | 85105276 A | 1/1987 |
| CN | 101435791 A | 5/2009 |

(Continued)

OTHER PUBLICATIONS

Search Report for German Patent Application No. 10 2016 120 581.8, German Patent Office, dated Jul. 17, 2017, 10 pp.

*Primary Examiner* — Gurpreet Kaur
(74) *Attorney, Agent, or Firm* — Kelly J. Smith; Endress+Hauser (USA) Holding Inc.

(57) ABSTRACT

The present disclosure relates to a measuring probe for measuring a concentration of an analyte in a measuring medium represented by a measured variable, including a probe housing having a first housing part and a second housing part, the first housing part being cap shaped closed on a front end by a sensor membrane and detachably connected to the second housing part on a rear end opposite the front end, such that the second housing part closes the cap at the rear end, and the first and the second housing parts define a probe interior sealed by the sensor membrane, a fluid electrolyte contained within the probe interior, an overflow channel in communication with the probe interior, and a seal adjacent the probe interior so as to seal the probe interior from the exterior of the measurement probe and simultaneously seal off the overflow channel.

16 Claims, 3 Drawing Sheets

(56) References Cited

U.S. PATENT DOCUMENTS

2009/0120792 A1\* 5/2009 Delessert ............. G01N 27/283
 204/415
2016/0178564 A1\* 6/2016 Losik ..................... G01N 27/31
 204/422
2017/0038329 A1\* 2/2017 Yang .................... G01N 27/301

FOREIGN PATENT DOCUMENTS

| CN | 101460834 A | 6/2009 |
|----|----|----|
| CN | 201716288 U | 1/2011 |
| CN | 202855823 U | 4/2013 |
| DE | 4439285 A1 | 5/1996 |
| DE | 4232909 C2 | 5/1997 |
| DE | 102008039465 A1 | 3/2010 |
| GB | 2220073 A1 | 12/1989 |
| WO | 9618889 A1 | 6/1996 |

\* cited by examiner

MEASURING PROBE AND METHOD FOR FILLING A PROBE INTERIOR

CROSS-REFERENCE TO RELATED APPLICATION

The present application is related to and claims the priority benefit of German Patent Application No. 10 2016 120 581.8, filed on Oct. 27, 2016, the entire contents of which are incorporated herein by reference.

TECHNICAL FIELD

The present disclosure relates to a measuring probe and a method for filling the probe interior of a measuring probe in a substantially gas-bubble-free manner.

BACKGROUND

Amperometric sensors can be used to determine a measured variable dependent upon the concentration of an analyte, such as the concentration or activity of the analyte or of a parameter, in particular, of a sum parameter that involves the concentration or activity of the analyte. The measuring medium can be a measuring fluid, e.g., a measuring liquid or a measuring gas. Typical analytes, whose concentration or activity or measured variables dependent upon them can be monitored using amperometric sensors, are, for example, gases such as oxygen, chlorine, carbon dioxide, hydrogen sulfide, ammonium, or nitrogen oxide.

Such sensors often have an amperometric measuring probe that is brought into contact with the measuring medium for example, by immersion in the measuring medium. The measuring probe can include a measuring circuit, in particular, an on-site electronics unit that forms one of the measured variable-dependent measurement signals and is equipped to emit the measurement signal, or a signal derived from it using an initial processing, via an interface to a higher-level data processing device. The measuring probe having the measuring circuit can be connected wirelessly or via a line to a remote measuring transducer, which further processes the measurement signal of the measuring probe and outputs it via a user interface or a higher-level unit connected to the measuring transducer for wireless or hardwired communication, e.g., a process controller or a programmable logic controller.

Amperometric measuring probes usually have a probe interior space separated from the measuring medium by a sensor membrane also designated herein as an electrolyte chamber as well as at least two, often also three, electrodes arranged within the probe interior space. The electrodes are connected in an electrically conductive manner to the measuring circuit.

One of the electrodes functions as the measuring or working electrode, an additional one as a counter electrode. The sensor membrane generally includes at least one functional layer functioning as a diffusion barrier through which the analyte is diffused from the measuring medium into the electrolyte chamber. The measuring circuit creates the measurement signal that represents the measured variable, e.g., the analyte concentration, on the basis of a current flowing through the electrolyte between the measuring electrode and the counter electrode. In many amperometric applications, the potential of the measuring electrode or the current flow between the measuring electrode and the counter electrode through the electrolyte is regulated using a third reference electrode, through which current does not flow.

An amperometric measuring probe is described in, for example, DE 10 2008 039465 A1. Accommodated inside the electrolyte chamber of the measuring probe that is sealed by the sensor membrane is a fluid electrolyte with which the two or three electrodes are in contact. One of these electrodes acts as a measuring electrode. It is integrated into a rod-shaped electrode body, which isolates the measuring electrode in relation to the electrolyte, with the exception of its end face. The electrode body extends into the electrolyte chamber, wherein the end face of the measuring electrode abuts the sensor membrane. In this manner, a thin electrolyte film forms between the sensor membrane and the, for this purpose, optionally roughened or textured end face of the measuring electrode. The intermediate, electrolyte-filled space thus formed between the end face of the measuring electrode and the membrane is here and in the following described as a measuring chamber.

The measuring probe has a first housing part designed in the form of a cap and a second housing part that forms a probe. The first housing part includes the sensor membrane and is designated as the membrane module or membrane cap. The first and the second housing parts are detachably connected to one another via a screw connection. The detachable connection allows for replacement of the first housing part by an identically designed housing part, and thus for a replacement of the membrane.

If there are gas bubbles in the fluid electrolyte that is contained within the probe interior, there is a risk that they could pass into the measuring chamber formed between the end face of the electrode body and the sensor membrane. In the operation of the measuring probe, this leads to an interference in the current flowing between the measuring electrodes, and thus in the measurement signal of the measuring probe. This can adversely affect measurement precision, or even make measurement using the measuring probe impossible.

Care must therefore be taken to insure that the inclusion of gas bubbles in the probe interior is avoided during manufacture of the measuring probe, or possibly during an exchange of the housing part containing the sensor membrane that takes place during maintenance. Amperometric measuring probes known in the prior art have, for this purpose, a pressure relief valve that closes the probe interior. The membrane cap is filled with electrolyte before connection to the probe shaft, wherein the electrolyte volume filled into the membrane cap is greater than the volume of the probe interior formed after the connection of the membrane cap to the probe shaft. During connection of the membrane cap to the second housing part that forms the probe shaft, the second housing part seals the membrane cap while forming the probe interior, electrolyte exiting from the electrolyte chamber via the pressure release valve. In this manner, it is ensured that the probe interior is fully filled with fluid electrolyte, so that no gas bubbles remain in the probe interior. In the event of a malfunction of the pressure relief valve because of damage to or deterioration of the valve, for example, it cannot be ensured that the probe interior is reliably sealed with respect to the measuring medium, and that an intrusion of measuring medium into the probe interior or an exit of electrolyte from the probe interior into the measuring medium is reliably prevented.

SUMMARY

It is therefore the aim of the present disclosure to specify a generic measuring probe and a method for filling the probe interior with electrolyte that avoid these disadvantages.

This aim is achieved by a measuring probe according to claim 1 and the method according to claim 14. Advantageous embodiments are listed in the dependent claims.

The measuring probe for measuring a concentration of an analyte in a measured variable representing a measuring medium comprises: a probe housing, which has at least a first housing part and a second housing part, wherein the first housing part is designed in the shape of a cap, in particular, a cylindrical one which is closed on a front end by a sensor membrane and, on a rear end opposite the front end, is detachably connected, specifically by a screw or plug connection to the second housing part so that the second housing part closes the cap at its rear end, and the first and the second housing parts enclose the probe interior sealed by the sensor membrane; a flowable electroyte, in particular, a fluid one contained within the probe interior; at least one overflow channel that leads into the probe interior; and a seal which, at a wall of the first housing part and at a wall of the second housing part, seals the probe interior off from the area surrounding the measurement probe and simultaneously seals off the overflow channel.

If an overflow channel opening into the probe interior is provided, upon assembly of the first and the second housing parts during the manufacture of the measuring probe, or when the first housing part is replaced for the purpose of upgrading the sensor membrane, the cap-shaped first housing part can be filled with a volume of fluid electrolyte that is larger than the volume of the probe interior that is enclosed by the interconnected first and second housing parts. In the connection of the two housing parts, the excess volume of electrolyte is expelled from the probe interior via the overflow channel. In this manner, the inclusion of gas bubbles in the electrolyte-filled probe interior can be avoided. In contrast to measuring probes known in the prior art, a pressure relief valve between the probe interior and the measuring medium can be omitted if the overflow channel is closed by a seal that simultaneously acts to seal the probe interior enclosed by the interconnected first and second housing parts. In this manner, the inclusion of gas bubbles in the probe interior during manufacture or maintenance of the measuring probe can be avoided on the one hand, and on the other, it can be ensured that the probe interior is sealed with respect to the measuring medium by the seal during operation, so that the electrolyte cannot exit into the measuring medium. The fluid medium can be a liquid electrolyte or a gel electrolyte.

During the operation of an amperometric measuring probe, the formation of an excess or negative pressure relative to the ambient pressure in the measuring medium may occur. This may occur, for example, during temperature oscillations or by a material exchange between the electrolyte and the measuring medium caused by osmosis. Pressure equalization between the probe interior and the measuring medium can then take place in the measuring probe described above via the pressure relief valve according to the prior art. It must be taken into account, however, that electrolyte from the probe interior passes into the measuring medium, which is not beneficial in all amperometric measuring probes. In the event of functional failure of the pressure relief valve that results in the formation of a high excess pressure in the probe interior, it can also lead to tearing or detachment of the sensitive sensor membrane.

An embodiment of the measuring probe according to the present disclosure provides that the measuring probe further comprise at least one specifically gas-filled or evacuated compensation volume, which is coupled to the probe interior in such a manner that a change in the prevailing pressure in the probe interior causes a change in volume of the compensation volume. Preferably, no material exchange between the compensation volume and the probe interior takes place here. If an excess or a negative pressure forms in the probe interior, a change in the compensation volume can then act to reduce the mechanical stress caused on the sensitive sensor membrane by the excess or negative pressure prevailing in the probe interior.

The at least one compensation volume can be separated from the probe interior by a flexible specifically, elastic wall. The compensation volume can, for example, be formed by a gas-filled or evacuated chamber in the first or the second housing part that is separated from the probe interior by the flexible specifically, elastic wall, such as a membrane made of an elastomer. In this embodiment, the flexible, in particular elastic wall, can advantageously have a higher elasticity than the sensor membrane.

The compensation volume can be separated from the probe interior by a flexible wall that is flexible because of its design, e.g., if the wall thickness selected is very thin, so that the wall can yield to excess pressure.

In an additional embodiment, the at least one compensation volume can be formed by a chamber formed within the probe housing, which is, in particular, open to the area surrounding the probe or the probe housing. The chamber can be formed as a blind- or through-hole within the second housing part.

In an alternate embodiment, the at least one compensation volume can be formed in an elastic plastic foam arranged within the probe interior. The plastic foam can be formed from an elastomer as a plastic body that encloses a plurality of compensation volumes in the form of gas-filled pores.

The first and the second housing parts can be designed to be interconnected in a detachable manner. A detachable connection of this sort is, for example, a positive or non-positive connection, such as a plug, clamp, or screw connection. Such a connection can, for example, be formed using two coupling components, wherein one coupling component, which is connected to the first housing part, is connected to a second coupling component, which is connected to the second housing part. In the case of a screw connection, the first coupling component is formed, for example, by a section of a first housing part provided with a thread, and the second coupling component is formed by a section of the second housing part provided with a thread that is complementary to the thread of the first housing part. The at least one overflow channel can be formed, for example, using a groove that runs between a surface of the first coupling component and a surface of the second coupling component that abuts the surface of the first coupling component if the first and the second coupling components are connected.

The first housing part may, for example, have a first thread and the second housing part can have a second thread complementary to the first thread, wherein the first and the second housing parts are detachably connected to each other by a screw connection of the first thread to the second thread. Advantageously, the first and the second housing parts are formed in an essentially cylindrical in particular, cylindrically symmetrical manner. In a connected state, the first and the second housing parts in this case are essentially cylindrically symmetrical with respect to a common housing axis.

The seal can also be designed as a sealing ring arranged on the side of the screw connection opposite the probe interior space, the outer circumference of which abuts an inner circumferential surface of the second housing part and the inner circumference of which abuts an outer circumferential surface of the first housing part. In this manner, the sealing ring seals the first and the second housing parts radially, relative to each other. In an alternate embodiment, the sealing ring can also be arranged as an axial seal between mutually facing end or shoulder faces of the first and the second housing parts.

The at least one overflow channel can be formed by a groove running essentially parallel to a cylindrical axis of the first and or the second housing part. If the first and the second housing parts can be connected via a screw connection, the at least one overflow channel can be formed via at least one groove running essentially parallel to the thread axis through the thread teeth of the first and/or the second thread. The sealing ring is advantageously arranged in the region of an end of the groove facing away from the probe interior, so that the sealing ring compressed between the first and the second housing parts seals the groove and with it, the overflow channel with respect to the area surrounding the measuring probe, if the first and the second housing parts are connected to each other.

Alternatively, the overflow channel can be formed by a hole running through the wall of the first and/or the second housing part.

The sensor membrane can form a porous diffusion barrier between a measuring medium and the sensor interior space, through which at least the analyte can diffuse from the measuring medium into the probe interior.

In the probe interior, at least two electrodes can be arranged that are connected in an electrically conducting manner to a measuring circuit arranged outside of the probe interior in particular, in or on the second housing part and wherein the measuring circuit is formed for the purpose of applying and/or regulating a specified voltage between the electrodes, detecting a current that in this arrangement flows through the electrolyte contained in the probe interior, and further processing and/or emitting a signal dependent upon the detected current as a measurement signal representing the measured variable.

The method according to the present disclosure for filling an inner space of a probe, particularly in a manner free of gas bubbles with a fluid electrolyte in order to measure a measured variable representing a concentration of an analyte in a measuring medium includes the filling of a fluid electrolyte into a first housing part that is designed in the shape of an, in particular, cylindrical cap that is closed off on a front end by a sensor membrane, and the manufacture of a connection that can be detached specifically, one designed as a screw or plug connection between the first housing part and the second housing part wherein the first housing part and the second housing parts are moved towards each other along a (notional) surface normal of the sensor membrane in such a manner that a partial section of the second housing part is guided into the cap at a rear end opposite the sensor membrane, and a partial volume of the electrolyte contained in the first housing part is displaced, so that this partial volume flows out from the first housing part via an overflow channel.

The sealing of the probe interior enclosed by the first housing part and the second housing part via a seal located on a wall of the first housing part and a wall of the second housing part, in that the movement of the first and the second housing parts with respect to each other is maintained so long as the seal between the wall of the first housing part and the wall of the second housing part is compressed in a sealed manner and simultaneously closes off the overflow channel.

The method can be carried out using the previously described measuring probe according to the present disclosure in one of the described embodiments.

The method can further comprise the preparation of at least one, specifically gas-filled or evacuated compensation volume, which is coupled to the probe interior in such a manner that a change in the prevailing pressure in the probe interior causes a change in volume of the compensation volume in particular, without the occurrence of a material exchange between the compensation volume and the probe interior.

The provision of the at least one compensation volume can comprise the creation of one closed chamber in particular, in the second housing part via a flexible specifically, elastic wall such that the flexible specifically, elastic wall is arranged in a section of the second housing part, which is in contact with the probe interior space when the detachable connection is created between the first and the second housing parts.

The provision of the at least one compensation volume can comprise the arrangement of an elastic plastic foam in the probe chamber that has a plastic body, which encloses a plurality of compensation volumes in the form of gas-filled pores. The plastic body can, for example, be formed from an elastomer.

The first housing part can have first fastening means and the second housing part a second fastening means complementary to the first fastening means, the first and the second fastening means serving to form a detachable, specifically positive or non-positive connection of the first housing part to the second housing part. The connection of the first to the second housing part can be accomplished, for example, by means of a clamp, plug, or screw connection.

Advantageously, the first housing part can have a first thread and the second housing part a second thread complementary to the first thread, wherein the creation of the detachable connection between the first and the second housing parts comprises the formation of a screw connection between the first and the second threads, and the seal is designed as a sealing ring arranged on the side of the screw connection opposite the probe interior space, the inner circumference of which abuts an outer circumferential surface of the second housing part and the outer circumference of which abuts an inner circumferential surface of the first housing part, and the at least one overflow channel is formed by at least one groove running essentially parallel to the thread axis through the thread teeth of the first and/or the second thread.

BRIEF DESCRIPTION OF THE DRAWINGS

The present disclosure is explained in further detail below on the basis of the exemplary embodiments shown in the illustrations. The figures show.

DETAILED DESCRIPTION

Figure 1:
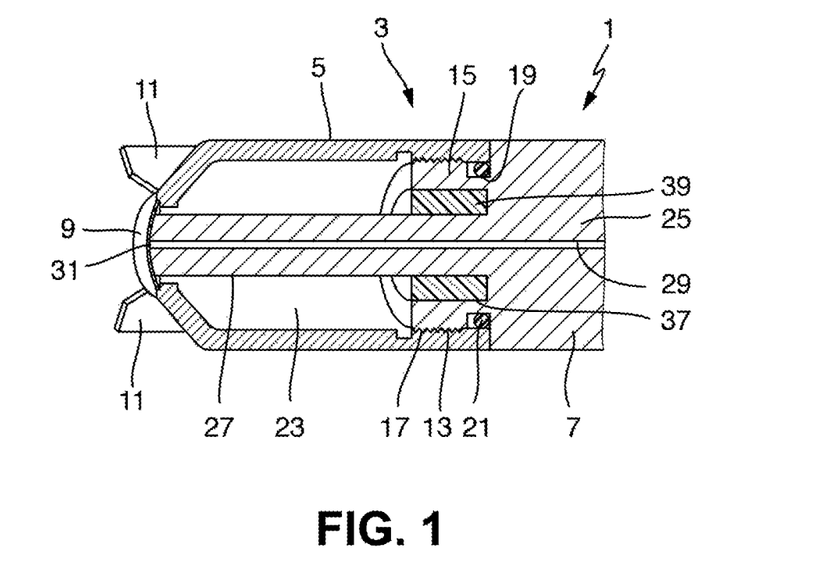
FIG. 1 shows a schematic sectional illustration of an end section of an amperometric measuring probe provided for contact with a measuring medium according to a first exemplary embodiment.

In FIG. 1, a front section of an amperometric measuring probe 1 for immersion in a measuring medium is shown in a longitudinal cross-section. The measuring probe 1 includes a probe housing 3, which is formed from a first housing part 5 and a second housing part 7 that are detachably interconnected via a screw connection. Probe housing 3 is essentially cylindrically symmetrical in the section illustrated, first housing part 5 and second housing part 7 having a common cylinder axis in their connected state. The housing parts can be made of a plastic, e.g., polyvinyl chloride (PVC), polytetrafluoroethylene (PTFE), polyvinylidene fluoride (PVDF), or of a metal. In the latter case, electrical insulation of the metallic housing is provided from the electrodes described more fully herein.

First housing part 5 is designed in the form of a cap. On its front side, i.e., the end opposite second housing part 7, it has a sensor membrane 9 that seals the first housing part 5 at this end. Projections 11 surrounding sensor membrane 9 are provided on the front end of first housing part 5 for protection of sensor membrane 9 from mechanical damage. On its other end, first housing part 5 has an internal thread 13 that serves to connect the first housing part 5 to the second housing part 7.

The second housing part 7 includes an external thread 17 complementary to internal thread 13 on an anterior, i.e., facing towards first housing part 5, end section 15. In the illustration shown in FIG. 1, threads 13 and 17 are detachably interconnected so that second housing part 7 seals first housing part 5 at the back. The two connected housing part 5 and 7 enclose a probe interior 23. Anterior end section 15 of second housing part 7 has a circumferential, annular groove 19 in which a sealing ring 21 is arranged. The groove 19 and sealing ring 21 are arranged on the side of the screw connection opposite the probe interior 23. The sealing ring 21 can be formed from an elastomer, for example, from a common sealing material known from the prior art, such as ethylene propylene diene monomer (EPDM), fluoroelastomers (FKM), or Nitrile butadiene rubber (NBR). When first housing part 5 and second housing part 7 are connected to each other, sealing ring 21 abuts the inner wall of first housing part 5 and the outer wall of second housing part 7 and, thus, seals probe interior 23, which is enclosed by the first and second housing parts 5, 7. Probe interior 23 is filled by a fluid electrolyte.

The second housing part 7 further includes a cylindrical probe shaft 25, of which only a front section is illustrated in FIG. 1. On its front end, i.e., the end facing first housing part 5, probe shaft 25 has a cylindrical electrode body 27 that extends into probe interior 23, the cross-section of which is reduced compared to the cross-section of probe shaft 25. Electrode body 27 is made of an electrically insulating material, for example, glass or plastic such as polyether ether ketone (PEEK) or PVC. Electrode body 27 encapsulates an electrically conductive measuring electrode 29 and electrically insulates the measuring electrode 29, except for its end face 31 with respect to the electrolytes contained in probe interior 23. End face 31 of measuring electrode 29 and the end face of electrode body 27 surrounding the measuring electrode 29 abut, at least partially, sensor membrane 9, so that there is only a thin electrolyte film between end face 31 of measuring electrode 29 and sensor membrane 9. The end face of electrode body 27 can have a structure that includes raised regions and depressions which are designed in such a manner that electrolyte can reach across the depressions in the region between end face 31 of measuring electrode 29 and sensor membrane 9. Alternately or additionally, a supporting grid can be provided between measuring electrode 29 and sensor membrane 9.

Measuring electrode 29 can, for example, be made of a metal, in particular a precious metal. Inside probe interior 23, an additional electrode is arranged that serves as a counter electrode (not shown in FIG. 1, for the sake of clarity) that can be designed as a ring sitting, for example, on electrode body 27. Optionally, a third electrode can be arranged in probe interior 23 that acts as a reference electrode for setting a potential of measuring electrode 29. The electrodes are connected in an electrically conductive manner to a measuring circuit arranged outside probe interior 23, for example, within probe shaft 25 or in a housing part of the measuring probe connected to probe shaft 25. The measuring circuit is designed to apply or regulate a current between the measuring electrode and the counter electrode to measure a current flowing through the electrolyte and to create and emit a measurement signal based upon the measured current strength. The measurement signal can, for example, be output to a data processing device such as a computer, a measuring transducer, or a controller connected to the measuring circuit.

Front end section 15 of second housing part 7 surrounds a rear section of electrode body 27 so as to form a ring chamber 37 extending around electrode body 27 and open to probe interior 23. Arranged in the ring chamber 37 is a hollow, cylindrical foam body 39, which is made from an elastomer and has a plurality of gas-filled pores. Foam body 39 can be formed from a silicone foam, for example. The foam body 39 acts as a compensation volume for equalizing pressure fluctuations inside the probe interior, as explained in more detail herein.

Figure 2:
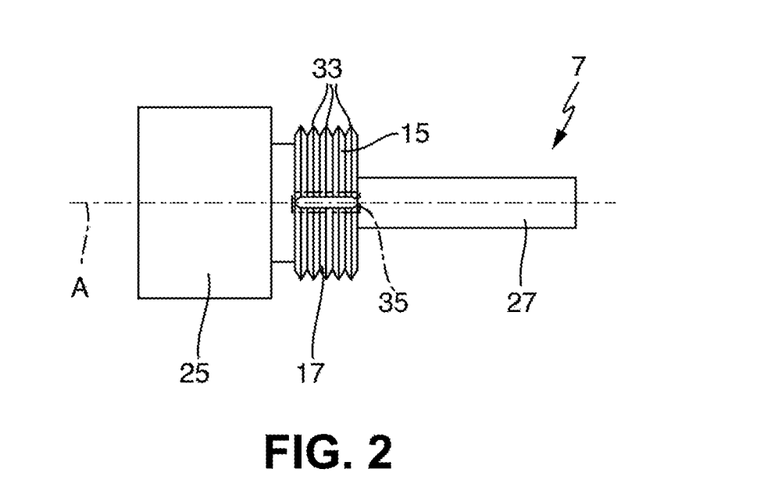
FIG. 2 shows a schematic illustration of a housing part of the amperometric measuring probe depicted in FIG. 1.

In FIG. 2, second housing part 7 is represented in a separate schematic side view. Identical parts of housing part 7 are indicated by the same reference characters in FIG. 1 and FIG. 2. Thread teeth 33 of outer thread 17 arranged on front section 15 are broken by a groove 35 extending parallel to the thread axis A of outer thread 17. The groove 35 serves to form an overflow channel communicating with probe interior 23.

In order to fill the probe interior with an essentially gas-bubble-free electrolyte, for example, during the manufacture of measuring probe 1 or in the course of maintenance measures in which first housing part 5 is exchanged for an identical housing part in order to replace sensor membrane 31 the procedure can be undertaken on measuring probe 1, which is illustrated in FIG. 1 and FIG. 2, as follows. If the two housings 5, 7 are separated from each other, the interior volume of cap-shaped housing part 5 is larger than the volume of probe interior 23 enclosed by first and second housing parts 5, 7 in a connected state, because end section 15 and electrode body 27 take up parts of the interior volume of housing part 5. Therefore, if first housing part 5 is fully, or almost fully, filled with electrolyte before the connection of second housing part 7, upon connection of the housing parts, electrolyte from probe interior 23 is forced through electrode body 27, and possibly also through front end section 15 of second housing part 7 that is provided with outer thread 17. During the screwing together of housing parts 5 and 7, electrolyte can exit via the overflow channel formed by the groove 35 that communicates with probe interior 23 and the area surrounding housing 3. Only if second housing part 7 is screwed so far into first housing part 5 that sealing ring 21 is compressed between the interior wall of first housing part 5 and the outer wall of second housing part 7, and thus seals probe interior 23 as well as the overflow channel (i.e., the groove 35), can electrolyte no longer leak out of probe interior 23.

This method ensures that probe interior 23 is free of gas bubbles that could disrupt a measurement using measuring probe 1.

If excess pressure or a pressure drop occurs in probe interior 23 during the screwing together of housing parts 5, 7 or during subsequent operation, the foam body 39 can function as a compensation volume, in order to reduce the pressure affecting sensor membrane 9 and the resulting mechanical damage to sensor membrane 9. Foam body 39 is designed in such a manner that it has a higher elasticity than sensor membrane 9. An increase in pressure in probe interior 23 then causes foam body 39 or the gas-filled pores contained in foam body 39 to decrease their volume, and thereby reduce or compensate for the pressure increase. Exemplary compression of foam body 39 is illustrated in FIG. 3, which shows a schematic illustration of measuring probe 1 illustrated in FIG. 1, in which the volume of foam body 39 is only half as large as in the illustration in FIG. 1 because of a pressure increase in probe interior 23.

Figure 3:
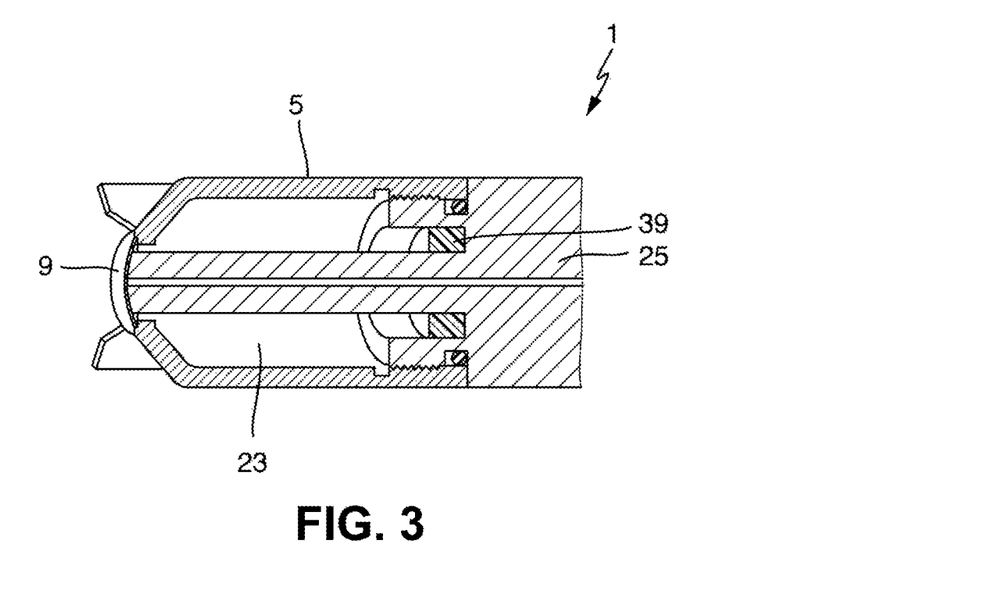
FIG. 3 shows a schematic sectional illustration of the measuring probe depicted in FIG. 1 in a state of excess pressure in the probe interior.
Figure 4:
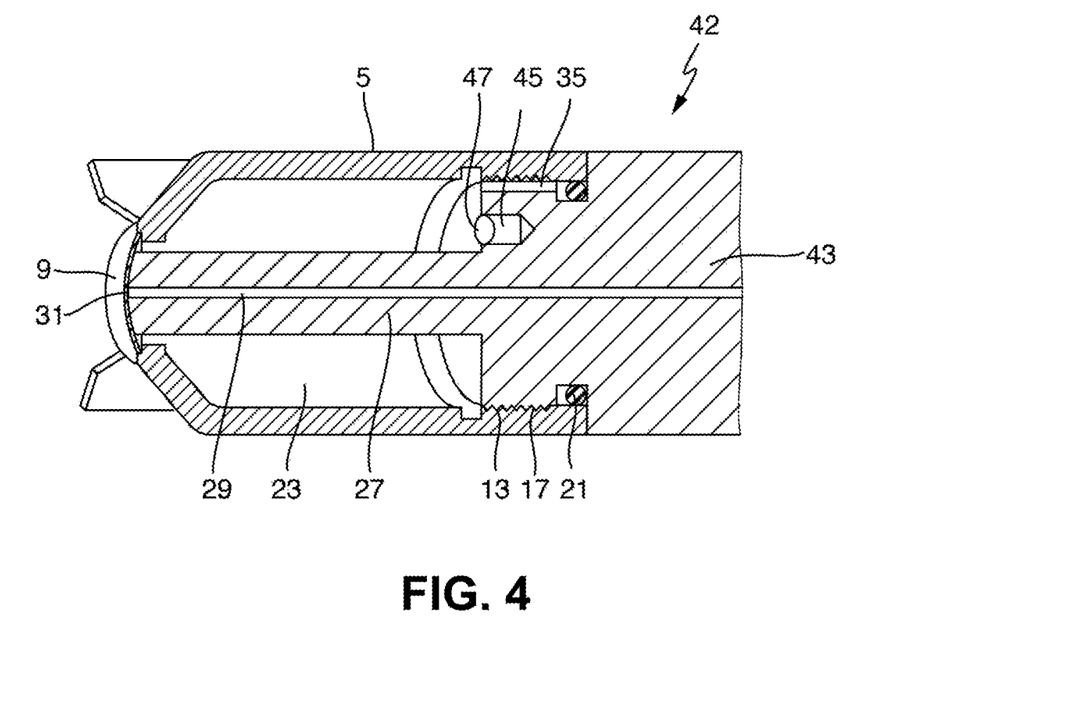
FIG. 4 shows a schematic sectional illustration of an end section of an amperometric probe provided for contact with a measuring medium according to another exemplary embodiment.

As an additional exemplary embodiment of the present disclosure, FIG. 4 shows a measuring probe 42 that is essentially identically designed to measuring probe 1 described in reference to FIGS. 1 through 3, which has, however, a compensation volume designed in the form of a gas-filled chamber, instead of a foam body. The parts of measuring probe 42 that are designed to be identical to the corresponding parts of measuring probe 1 according to FIGS. 1 through 3 are provided with the same reference characters. Like measuring probe 1, measuring probe 42 is equipped with a cap-shaped first housing part 5 that is designed to be identical here to the corresponding first housing part of measuring probe 1. A second housing part 43 is again detachably connected to first housing part 5 via a screw connection between an interior thread 13 of first housing part 5 and an outer thread 17 of second housing part 43 and, together with first housing part 5, encloses a probe interior 23. A fluid electrolyte is accommodated in probe interior 23. On its front end section facing first housing part 5, second housing part 43 has a cylindrical electrode body 27 that electrically insulates a measuring electrode 29 up to its end face 31, in relation to the electrolyte.

As in measuring probe 1, measuring probe 42 includes an overflow channel running through the screw connection of both housing parts 5, 43 that is formed by a groove 35 running through the thread teeth of outer thread 17 of second housing part 43. It is clear that other detachable connection technologies are also suitable in place of a screw connection for connecting first housing part 5 to second housing part 43. In this case, the overflow channel can also be formed by a groove running in the first or the second housing part. Completely analogous to the exemplary embodiments described in reference to FIGS. 1 through 3, probe interior 23 of measuring probe 42 described in FIG. 4 can also be filled with gas-bubble-free electrolyte in the manner described, if first housing part 5 is first filled with an electrolyte volume that is greater than the volume of probe interior 23 enclosed by first housing part 5 and second housing part 43 in a connected state, so that, during connection of housing parts 5 and 43, electrolyte is forced through the overflow channel out of the housing up until sealing ring 21 tightly seals the overflow channel and probe interior 23.

A gas-filled chamber 45 in the form of a blind hole that is separated from the probe interior 23 by a flexible, specifically elastic, wall 47 is provided in second housing part 43 of measuring probe 42. Wall 47 can be formed by an elastic membrane. In order to ensure that wall 47 has a higher elasticity than membrane 9, it can be formed from a softer polymer material specifically, an elastomer and/or have a smaller thickness than sensor membrane 9. Wall 47 can be formed as a plastic membrane, such as from PTFE, PVDF, polysulfones (PES), or polyethylene terephthalate (PET). In the event of a pressure change in probe interior 23, the gas contained in chamber 45 can expand or be compressed, and thus serve to compensate for the pressure change. Mechanical stress to sensor membrane 9 caused by pressure changes in probe interior 23 and the danger of damage to or detachment of sensor membrane 9 are thus minimized.

Figure 5:
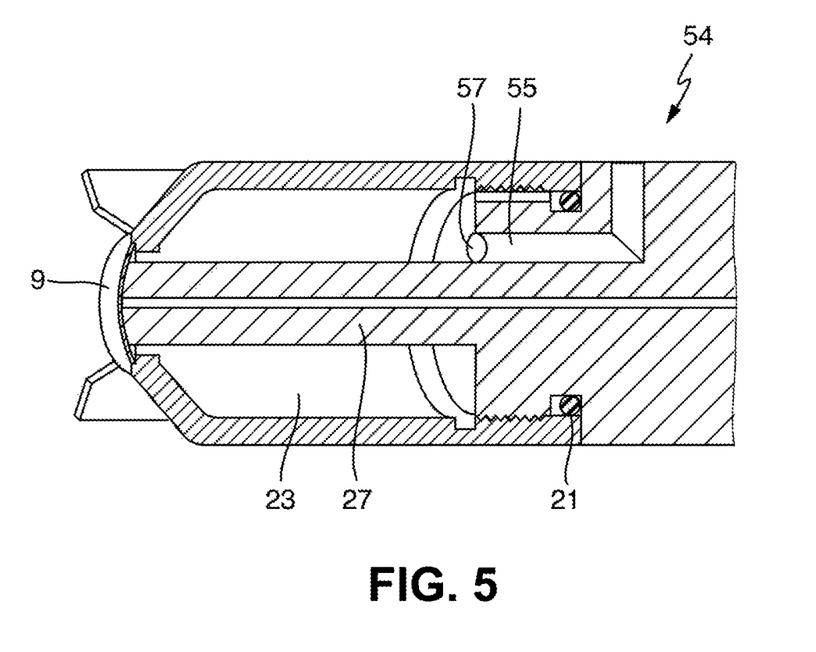
FIG. 5 shows a schematic sectional illustration of an end section of an amperometric measuring probe provided for contact with a measuring medium according to a further exemplary embodiment.

A measuring probe 54 is schematically represented in FIG. 5 as a further exemplary embodiment of the present disclosure. Measuring probe 54 is designed essentially identically to measuring probe 42 illustrated in FIG. 5. Identically designed parts of the measuring probes 54, 42, and 1 shown in the figures are indicated using identical reference characters.

The only difference between measuring probe 42 shown in FIG. 4 and measuring probe 54 shown in FIG. 5 is in the design of the compensation volume. In measuring probe 54, the compensation volume is formed by a degasification channel 55, which is closed on its end facing probe interior 23 by an elastic wall 57, and is open to the area surrounding measuring probe 54 at its other end. Elastic wall 57 has a higher elasticity than sensor membrane 9, so that stress to sensor membrane 9 is minimized by a pressure change in probe interior 23, as already described above in reference to FIG. 4. It is either drawn here into the interior of degasification channel 55 or bulges into probe interior 23. The gas volume consequently increases or decreases within degasification channel 55, and thus acts as a compensation volume.

The invention claimed is:

1. A measuring probe for measuring a measured variable representing a concentration of an analyte in a measuring medium, comprising:
   a probe housing including a first housing part and a second housing part, the first housing part generally having a cap shape closed on a front end by a sensor membrane and having a detachable connection to the second housing part on a rear end opposite the front end such that the second housing part closes the first housing part at the rear end, thereby defining a probe interior, wherein the sensor membrane seals the probe interior at the front end, and wherein the detachable connection is a screw or plug connection;
   a flowable fluid electroyte contained within the probe interior;
   an overflow channel in communication with the probe interior; and
   a seal disposed between a first wall of the first housing part and a second wall of the second housing part such that the seal abuts the probe interior and seals off the probe interior from the exterior of the measurement probe and simultaneously seals off the overflow channel opposite the probe interior;
   wherein the first housing part and the second housing part are structured so as to be connected to each other via a positive and/or non-positive connection between a first coupling component connected to the first housing part and a second coupling component connected to the second housing part, and wherein the overflow channel is defined by a groove extending between a first surface of the first coupling component and a second surface of the second coupling component abutting the first surface when the first coupling component and the second coupling component are connected.

2. The measuring probe of claim 1, further comprising a gas-filled or evacuated compensation volume coupled to the probe interior such that a change in a prevailing pressure in the probe interior causes a change in a volume of the compensation volume while preventing a material exchange between the compensation volume and the probe interior.

3. The measuring probe of claim 2, wherein the compensation volume is separated from the probe interior by a flexible elastic wall.

4. The measuring probe of claim 3, wherein the elastic wall has a higher elasticity than the sensor membrane.

5. The measuring probe of claim 2, wherein the compensation volume is a chamber that is open to the exterior of the probe interior.

6. The measuring probe of claim 5, wherein the chamber is a blind or through hole within the second housing part.

7. The measuring probe of claim 2, wherein the compensation volume is embodied in an elastic foam disposed within the probe interior having a body that encloses a plurality of gas-filled pores, which define the compensation volume.

8. The measuring probe of claim 1, wherein the first housing part has a first thread and the second housing part has a second thread complementary to the first thread, and wherein the detachable connection of the first housing part and the second housing part is a screw connection between the first thread to the second thread.

9. The measuring probe of claim 8, wherein the seal is embodied as a sealing ring disposed on a side of the screw connection opposite the probe interior, the sealing ring having an outer periphery that abuts an inner peripheral surface of the first housing part and having an inner periphery that abuts an outer peripheral surface of the second housing part.

10. The measuring probe of claim 8, wherein the overflow channel is defined by at least one groove extending parallel to a thread axis through thread teeth of the first thread and/or the second thread.

11. The measuring probe of claim 1, wherein the sensor membrane forms a porous diffusion barrier between a measuring medium and the probe interior through which at least the analyte can diffuse from the measuring medium into the probe interior.

12. The measuring probe of claim 1, wherein disposed in the probe interior are at least two electrodes electrically connected with a measuring circuit arranged outside of the probe interior in or on the second housing part, and wherein the measuring circuit is configured to apply and/or regulate a specified voltage between the at least two electrodes, to detect a current that thereby flows through the electrolyte contained within the probe interior, and to process and/or emit a signal dependent upon the detected current as a measurement signal representing the measured variable.

13. A method for filling in a manner free of gas bubbles a probe interior of a probe for measuring a measured variable representing a concentration of an analyte in a measuring medium using a fluid electrolyte, comprising:

filling a first housing part of a probe with a fluid electrolyte, the first part having the shape of a cylindrical cap closed on a front end by a sensor membrane;

assemblying a detachable connection, structured as a screw or plug connection, between the first housing part and a second housing part of the probe, wherein the first housing part and second housing part are moved toward each other along a surface normal of the sensor membrane such that a partial section of the second housing part extends into the first housing part at a rear end opposite the sensor membrane, thereby defining a probe interior of the probe for containing the electrolyte, and a partial volume of the electrolyte contained in the first housing part is displaced and flows out of the first housing part via an overflow channel;

sealing the probe interior using a seal disposed between a first wall of the first housing part and a second wall of the second housing part, wherein during the assemblying, the first housing part and the second housing part are moved toward each other until the seal between the first wall and the second wall is compressed in a sealed manner and simultaneously closes off the overflow channel; and providing a gas-filled or evacuated compensation volume in the second housing part, the compensation volume coupled to the probe interior such that a change in a prevailing pressure in the probe interior causes a change in a volume of the compensation volume while preventing a material exchange between the compensation volume and the probe interior.

14. The method of claim 13, wherein providing the compensation volume includes creating in the second housing part a chamber closed off by a flexible, elastic wall that is arranged in a section of the second housing part that is in contact with the probe interior when the detachable connection is assembled between the first housing part and the second housing part.

15. The method of claim 13, wherein providing the compensation volume includes arranging in the probe interior an elastic plastic foam having a body that encloses a plurality of gas-filled pores, which define the compensation volume.

16. The method of claim 13, wherein:

the first housing part includes a first thread and the second housing part includes a second thread complementary to the first thread;

the assemblying of the detachable connection between the first housing part and the second housing part includes making a screw connection between the first thread and the second thread;

the seal is embodied as a sealing ring disposed on a side of the screw connection opposite the probe interior, the sealing ring having an inner circumference that abuts an outer circumferential surface of the second housing part and having an outer circumference that abuts an inner circumferential surface of the first housing part; and the overflow channel is a groove through thread teeth of the first thread and/or the second thread, the groove extending parallel to a thread axis of the first thread and/or the second thread.

* * * * *